W. C. CUTLER.
ROTARY PRESSURE OR VACUUM PUMP.
APPLICATION FILED JULY 10, 1913.
1,188,737. Patented June 27, 1916.
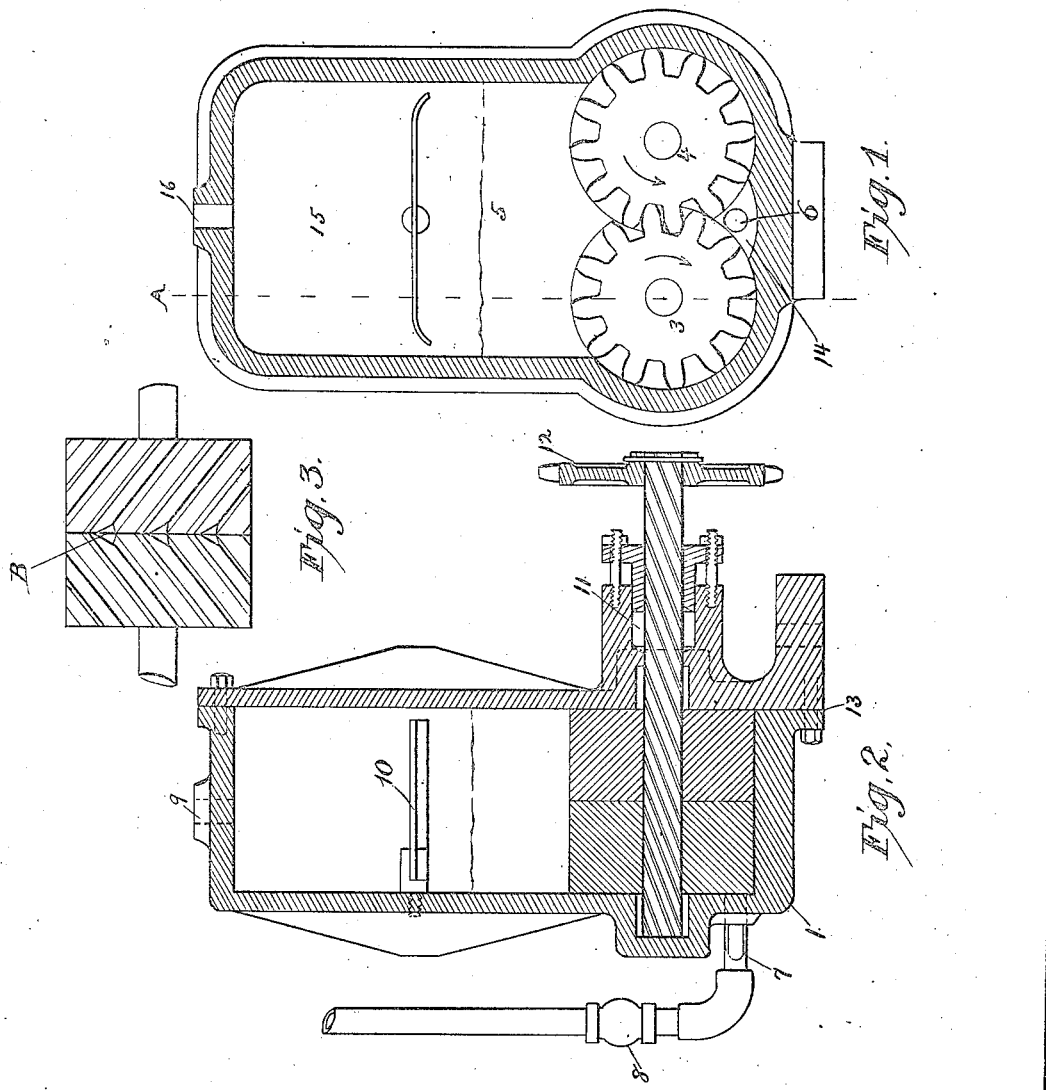
WITNESSES:
INVENTOR
William Clifton Cutler

UNITED STATES PATENT OFFICE.

WILLIAM CLIFTON CUTLER, OF SAWTELLE, CALIFORNIA, ASSIGNOR TO LEONARD ROTARY PUMP CORPORATION, A CORPORATION OF CALIFORNIA.

ROTARY PRESSURE OR VACUUM PUMP.

1,188,737.  Specification of Letters Patent.  Patented June 27, 1916.

Application filed July 10, 1913. Serial No. 778,331.

*To all whom it may concern:*

Be it known that I, WILLIAM C. CUTLER, a citizen of the United States, residing at Sawtelle, in the county of Los Angeles and State of California, have invented a new and useful Rotary Pressure or Vacuum Pump, of which the following is a specification.

This invention relates to rotary pressure or vacuum pumps for pumping liquids or gases and the object of the invention is to provide a rotary pressure or vacuum pump by means of which a far greater pressure or vacuum may be produced than heretofore by any known rotary pump.

A further object is to prevent internal leakage in the pump.

A further object of the invention is to eliminate all valves and to attain efficiency of operation, simplicity and economy of construction and entire absence of reciprocating parts.

In carrying out my invention, I employ a pair of gears which mesh with each other and rotate in opposite directions, the gears being confined in a casing with an admission at one side and an exhaust at the other. The gears fit with a close working fit within the casing and when employed as a pump for gases or vacuum, are submerged in some lubricating liquid which not only acts as a seal to prevent any back leakage from the exhaust side to the inlet side; but, thoroughly lubricates all working parts. When used as a liquid pump the liquid forms its own seal.

Referring to the drawings: Figure 1 is a vertical cross section through the device. Fig. 2 is a section on line A. Fig. 3 shows the form of gear used.

In its preferred form the invention consists of a casing 1 within which are two gears meshing with each other and mounted on shafts 3 and 4 which are journaled in the sides of the casing 1. The casing fits the gears only about one half their circumference, leaving the upper portion of the gears in contact with the sealing fluid 5.

6 is the inlet port connecting on outside of pump with pipe 7 and some form of check valve 8 to prevent the liquid from leaking out when pump is not running. An exhaust port is provided at 9 and a baffle plate is mounted at 10. The shaft 3 extends through a stuffing box 11 and carries a sprocket wheel or pulley at 12. The casing is in two parts and bolts together at line 13.

In operation the gears are rotated in the direction of the arrow which produces a suction through pipe 7 on account of the teeth of the gears removing all gas or liquid from space 14 and carrying it circumferentially around with the gears where it discharges into the liquid 5 through which it rises to the space 15 and finally passes out of exhaust port 16.

As the gears rotate and their teeth close together, a certain amount of liquid will be trapped next the bottom of each tooth; this liquid cannot escape as rapidly as it is necessary to rotate the gears thereby setting up an outward or pressing apart strain on the gears and bearings, causing them to run hard and necessitating a loss of power. In order to obviate this difficulty, I dispose the teeth of the gears obliquely, forming what are called herringbone gears Fig. 3, but so placing them that as the teeth come together the center angle A in the gears is the last part of the tooth to strike, thus gradually running any entrapped liquid from the side casing inwardly toward the center of the gears, where the final small amount of liquid is discharged at the relief opening shown at B, Fig. 3, which is a cut taken out of the face of the tooth and extending downwardly toward its base. This relief opening is of great importance as it almost entirely relieves all outward strains due to the imprisoned liquid even under speeds running over 1000 revolutions per minute.

Where the gears are disposed horizontally, a splash plate is mounted at 10 to prevent the liquid under the speed of the gears from being thrown through the exhaust port 9, where the pump is to be operated as an air pressure or exhaust pump. When used as a liquid pump, the splash plate can be dispensed with. With this form of pump and gears, the inventor has at 750 revolutions per minute, attained a pressure exceeding 185 pounds per square inch in a single stage compressor.

What I claim is:

1. A rotary air or liquid pump comprising a case with inlet and outlet ports; a pair of intermeshing gears rotatively mounted within said case, the gears having teeth obliquely disposed with the vertex of their angle at their last point of contact; a relief opening cut from the face of the tooth at the vertex of their angle and extending downward toward the base of the tooth.

2. A rotary air or liquid pump comprising a case in which are mounted a pair of intermeshing gears; an intake port in the case at one side of the gears; an exhaust port in the case at the opposite side of the gears; the teeth of said gears obliquely disposed, forming an angle at the center of the face of the gears at the point of last contact; a relief opening cut from the face of the gears at the vertex of their angle and extending toward the base of the tooth.

3. A rotary air or liquid pump comprising a case in which are mounted a pair of intermeshing gears; an intake port in the case at one side of the gears; an exhaust port in the case at the opposite side of the gears; the teeth of said gears obliquely disposed forming an angle at the center of the face of the gears at the point of last contact; a relief opening cut from the face of the gears at the vertex of their angle and extending toward the base of the tooth; a liquid seal covering said gears.

In testimony whereof, I have hereunto set my hand at Los Angeles, California, this 12th day of April, 1913.

WILLIAM CLIFTON CUTLER.

In presence of—
   A. F. TRIPPELL,
   E. A. HIGGINS.